(12) United States Patent
Shiba

(10) Patent No.: US 7,055,219 B2
(45) Date of Patent: Jun. 6, 2006

(54) HINGE FOR PORTABLE TERMINAL

(75) Inventor: Tsuyoshi Shiba, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 5 days.

(21) Appl. No.: 10/903,726

(22) Filed: Jul. 30, 2004

(65) Prior Publication Data

US 2005/0055806 A1    Mar. 17, 2005

(30) Foreign Application Priority Data

Aug. 4, 2003    (JP)    ............................. 2003-286282

(51) Int. Cl.
    *E05D 3/10*    (2006.01)
(52) U.S. Cl. ............................. 16/367; 16/330; 16/342; 379/433.12; 379/433.13; 248/917; 248/919; 361/681; 455/575.3
(58) Field of Classification Search ................. 16/367, 16/330, 342; 248/917, 919; 379/430; 361/679, 361/681, 682; 455/575.3 X, 90, 550
See application file for complete search history.

(56) References Cited

U.S. PATENT DOCUMENTS

| 6,347,433 | B1 * | 2/2002 | Novin et al. | .................... | 16/367 |
| 6,549,789 | B1 * | 4/2003 | Kfoury | .................... | 455/550.1 |
| 6,658,272 | B1 * | 12/2003 | Lenchik et al. | .............. | 345/164 |
| 6,697,117 | B1 * | 2/2004 | Park | ........................... | 348/373 |
| 6,742,221 | B1 * | 6/2004 | Lu et al. | ........................ | 16/367 |
| 6,798,646 | B1 * | 9/2004 | Hsu | ............................. | 361/681 |
| 6,804,861 | B1 * | 10/2004 | Hsu | ............................. | 16/366 |
| 6,839,576 | B1 * | 1/2005 | Aagaard et al. | ......... | 455/575.1 |

(Continued)

FOREIGN PATENT DOCUMENTS

JP    2002139020 A  *  5/2002

(Continued)

*Primary Examiner*—Brian E. Glessner
*Assistant Examiner*—Mark Williams
(74) *Attorney, Agent, or Firm*—Notaro & Michalos PC

(57) ABSTRACT

To provide, in a portable terminal such as a cellular phone, especially of a foldable type, a hinge for portable terminal that not only has both functions of allowing a second casing having a display portion to turn in a horizontal direction relative to a first casing having a keyboard portion and of allowing the second casing to open/close relative to the first casing, but also is capable of preventing external leakage of a lubricating oil and is formed to be as compact as possible so that a mounting space can be saved. The hinge for portable terminal is a hinge coupling a first casing having a keyboard portion and a second casing having a display portion to each other, including: a rotary hinge part to which the first casing is coupled to be turnable relative to the second casing; and an opening/closing hinge part to which the second casing is coupled to be openable/closable relative to the first casing, wherein: the rotary hinge part has a fixed member attached to the first casing and a rotary member attached to the fixed member with a turn thereof being controlled via a first cam mechanism; and the opening/closing hinge part is provided in the rotary member and has an opening/closing member which is rotatably mounted with a rotation thereof being controlled to be in a perpendicular direction to a direction of the turn of the rotary hinge part via a second cam mechanism and to which an end portion of the second casing is coupled.

7 Claims, 22 Drawing Sheets

U.S. PATENT DOCUMENTS

| | | | |
|---|---|---|---|
| 6,845,546 B1 * | 1/2005 | Lu et al. | 16/367 |
| 6,883,206 B1 * | 4/2005 | Yang et al. | 16/337 |
| 2004/0198474 A1 * | 10/2004 | Jung et al. | 455/575.1 |
| 2004/0203535 A1 * | 10/2004 | Kim et al. | 455/90.3 |
| 2005/0054396 A1 * | 3/2005 | Yang | 455/575.3 |
| 2005/0064919 A1 * | 3/2005 | An et al. | 455/575.3 |
| 2005/0066474 A1 * | 3/2005 | Hsu et al. | 16/330 |
| 2005/0119023 A1 * | 6/2005 | Sudo et al. | 455/550.1 |
| 2005/0245294 A1 * | 11/2005 | Gupte et al. | 455/575.1 |

FOREIGN PATENT DOCUMENTS

JP         2004304458 A   *  10/2004

\* cited by examiner

HINGE FOR PORTABLE TERMINAL

BACKGROUND OF THE INVENTION

1. Field of the Invention

The present invention relates to a hinge for portable terminal suitable for use in portable terminals such as a cellular phone, a PHS, and a small computer.

2. Description of the Related Art

In recent years, the function and performance of portable terminals are getting remarkably higher and the portable terminals are becoming more compact. Among them, as for a cellular phone, a PHS, and the like, in particular, the following structure is becoming on the mainstream in order to realize, when not in use, the compact size, the protection of a keyboard portion and a display portion, and further, the prevention of the malfunction of the keyboard portion. That is, a first casing having the keyboard portion and a microphone thereon and a second casing having the display portion and a speaker thereon are foldable via a hinge, with the keyboard portion and the display portion facing each other. In such a cellular phone, PHS, or the like, the display portion is formed to be vertically long so as to have a slim shape. However, now that the portable terminals are additionally equipped with various functions, for example, a downloaded movie display function and a television image display function, such a vertically long display portion is in some cases poor in visibility for those who are used to viewing a laterally long screen such as a screen of a television, a movie, a personal computer, or the like. Moreover, there has also arisen a problem such that, when information originally assumed to be displayed on a laterally long display portion is transmitted or inputted to a portable terminal having such a vertically long display portion, the information cannot be completely displayed thereon.

This has given rise to a need for a hinge that not only foldably couples the second casing to the first casing, but also allows the second casing to turn relative to the first casing in a direction perpendicular to an opening/closing direction when it is at a predetermined opening/closing position.

As a hinge having such a function, that described in Japanese Patent Application Laid-open No. 2003-69676 is known.

The hinge described in this patent application publication is structured such that a circulation spindle part of a rotary hinge part that is pivotally attached to a bottom of a first casing is bent to be led to an upper end side of a second casing and an opening/closing hinge part coupled to the second casing is attached to an upper end portion of the circulation spindle part. This structure has such a problem that a lubricating oil especially in the rotary hinge part leaks outside to stain hands and clothes, and in addition, the structure of the entire hinge becomes large to occupy a large mounting space, which hinders the downsizing of the portable terminal.

SUMMARY OF THE INVENTION

It is an object of the present invention to provide, in a portable terminal such as a cellular phone, especially of a foldable type, a hinge for portable terminal which not only has both functions of allowing a second casing having a display portion thereon to turn in a horizontal direction relative to a first casing having a keyboard portion thereon and of allowing the second casing to open/close relative to the first casing, but also is capable of preventing a lubricating oil from leaking outside and is formed as compact as possible so that a mounting space can be saved.

In order to achieve the object stated above, the present invention is a hinge coupling a first casing on which a keyboard portion is provided and a second casing on which a display portion is provided to each other, including: a rotary hinge part to which the first casing is coupled to be turnable relative to the second casing; and an opening/closing hinge part to which the second casing is coupled to be openable/closable relative to the first casing, wherein: the rotary hinge part has a fixed member attached to the first casing and a rotary member attached to the fixed member with a turn thereof being controlled via a first cam mechanism; and the opening/closing hinge part is provided in the rotary member and has an opening/closing member which is rotatably mounted with a rotation thereof being controlled to be in a perpendicular direction to a direction of the turn of the rotary hinge part via a second cam mechanism and to which an end portion of the second casing is coupled.

In the above-described invention, the first cam mechanism may include: a first cam portion provided at an upper end of the fixed member; a hinge shaft inserted through a pivotally supporting cylinder of the fixed member in an axial direction; a second cam portion provided at a position facing the first cam portion on a lower face of the rotary member attached to an upper end portion of the hinge shaft; and a resilient means for bringing the second cam portion into pressure contact with the first cam portion provided on the fixed member side, the resilient means being resiliently provided between the hinge shaft and the pivotally supporting cylinder.

The above-described invention may also be structured such that at least one of the first cam mechanism and the second cam mechanism has an absorbing function, the absorbing function of the first cam mechanism being a function of automatically turning the rotary member from a predetermined turn angle, and the absorbing function of the second cam mechanism being a function of automatically opening/closing the opening/closing member from a predetermined opening/closing angle.

The above-described invention may also be structured such that the rotary hinge part is allowed to operate from an instant when the opening/closing hinge part is opened to a predetermined angle.

The above-described invention may also be structured such that the opening/closing member is a hinge cylinder.

The above-described invention may further include a means for allowing the rotary hinge part to operate from the instant when the opening/closing hinge part is opened to the predetermined angle, the means being provided between the opening/closing member of the opening/closing hinge part and the fixed member of the rotary hinge part.

The above-described invention may be structured such that each of the first cam mechanism and the second cam mechanism is constituted of a cam and a cam floor in which cam portions are formed on respective facing surfaces thereof, one of the cam portions being in pressure contact with the other cam portion.

The above-described structure of the present invention can bring about the following effects. It is possible to prevent a screen from being scratched as much as possible when not in use since a face of the second casing where a display portion and a camera are provided is positioned on a lower side while the second casing is folded relative to the first casing. In addition, the second casing is allowed to open/close in a vertical direction by the opening/closing hinge part and is turnable in a horizontal direction while the opening/closing hinge part is opened, thereby facilitating the use of the display portion in a laterally long state.

DETAILED DESCRIPTION OF THE PREFERRED EMBODIMENTS

Figure 1:
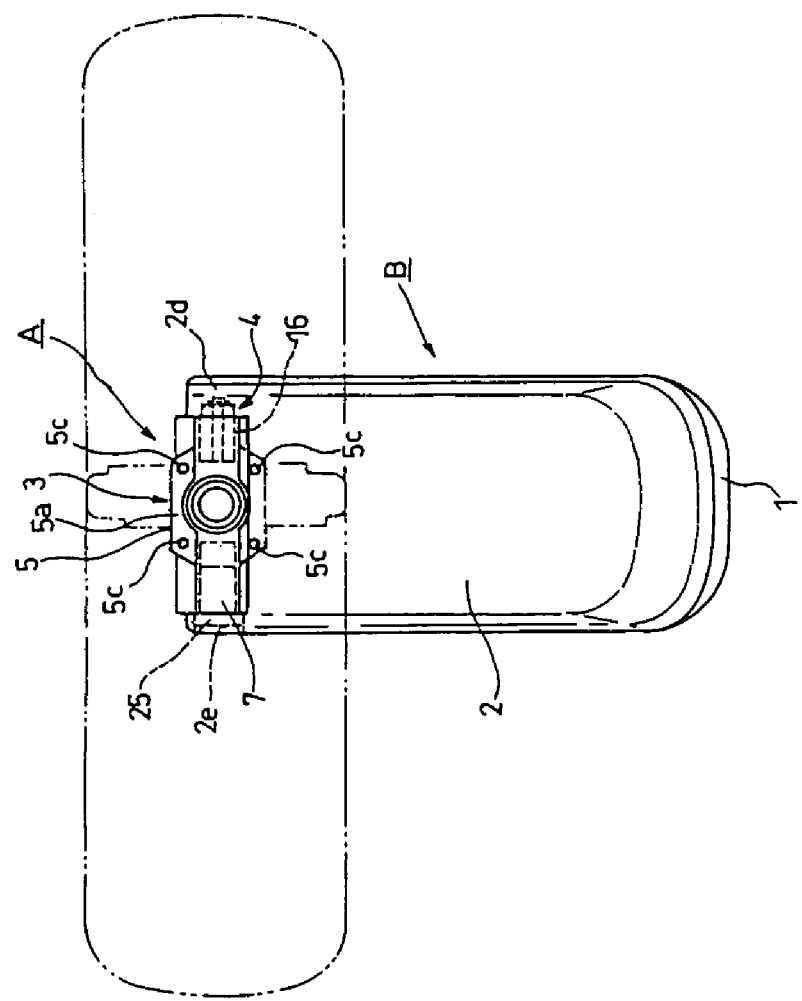
FIG. 1 is a plane view of a cellular phone in which the hinge for portable terminal according to the present invention is embodied, showing the state when a first casing and a second casing are folded.
Figure 2:
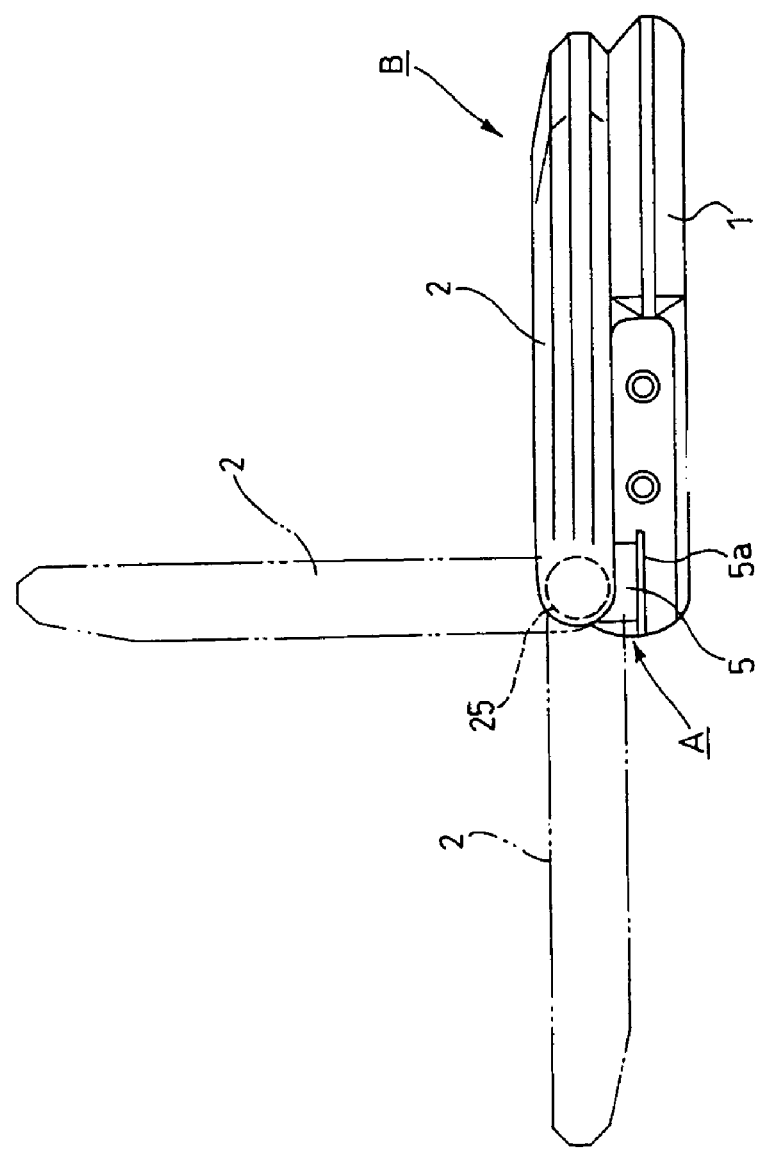
FIG. 2 is a right side view of the cellular phone in which the hinge for portable terminal according to the present invention is embodied, showing the state when the first casing and the second casing are folded.
Figure 3:
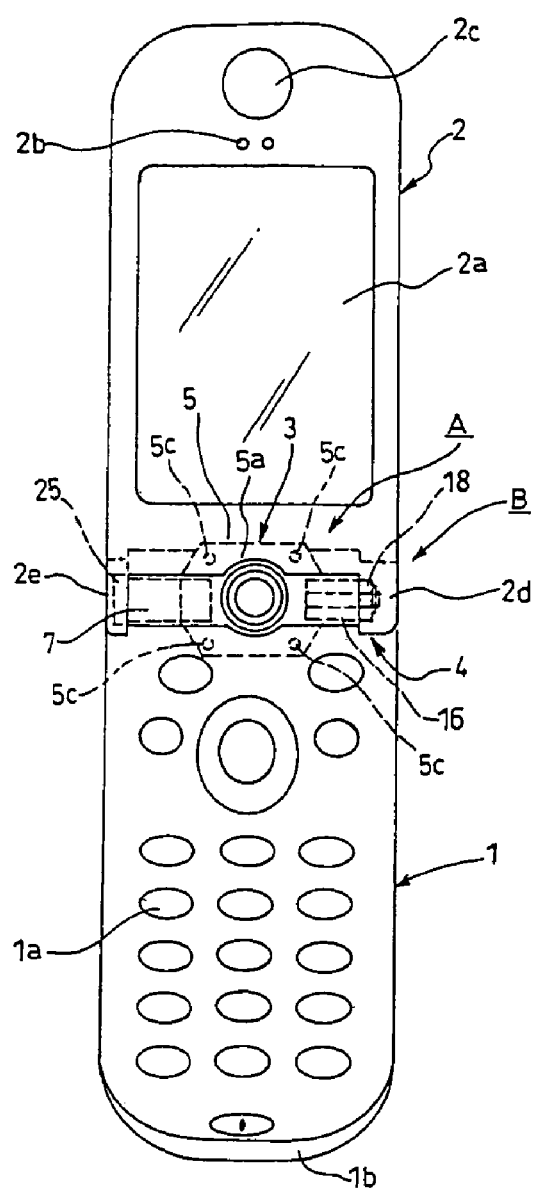
FIG. 3 is a plane view showing the state when the second casing is opened relative to the first casing from the state shown in FIG. 1.
Figure 4:
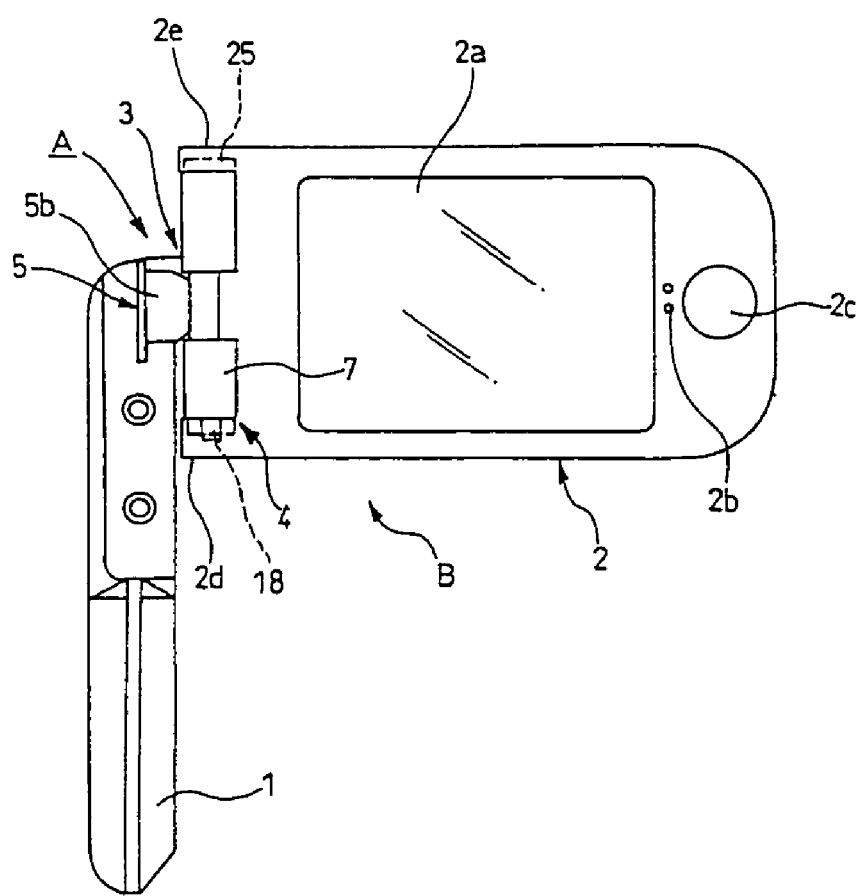
FIG. 4 is a side view showing the state when the second casing is turned after being opened 90° relative to the first casing from the state shown in FIG. 1.
Figure 5:
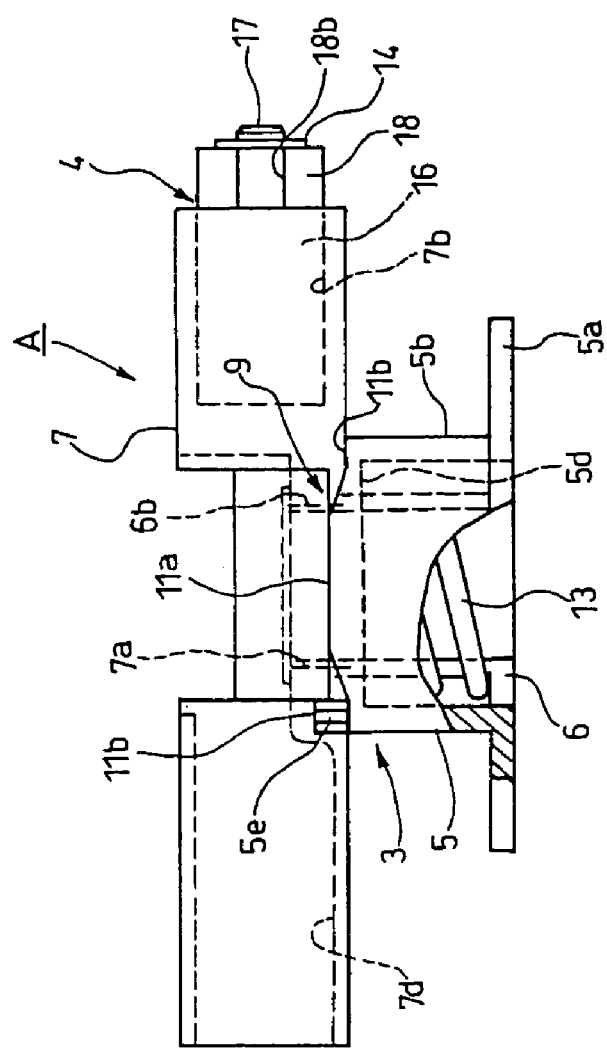
FIG. 5 is a partial front cross-sectional view of the hinge for portable terminal according to the present invention.
Figure 6:
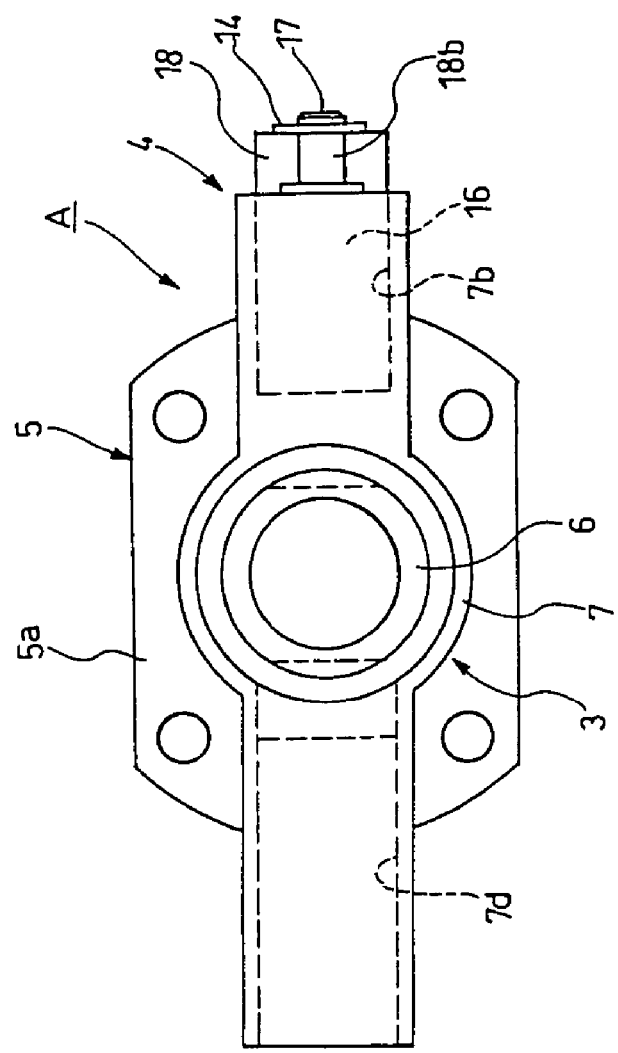
FIG. 6 is a plane view of the hinge for portable terminal according to the present invention.
Figure 7:
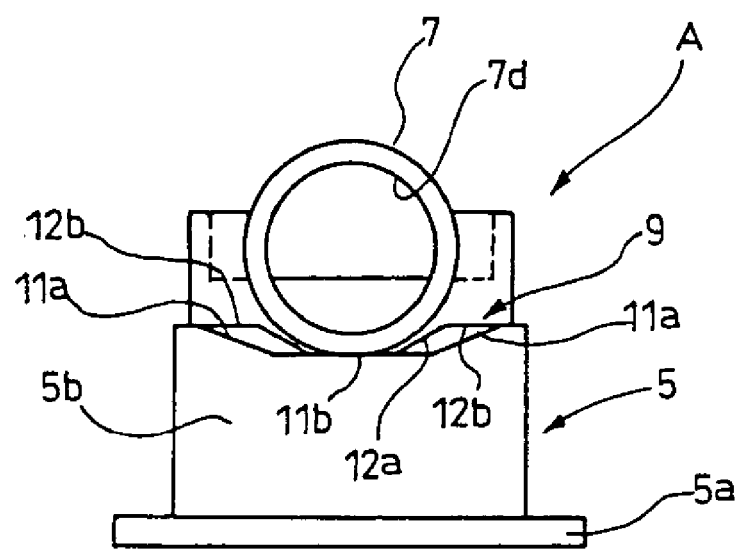
FIG. 7 is a left side view of the hinge for portable terminal according to the present invention.
Figure 8:
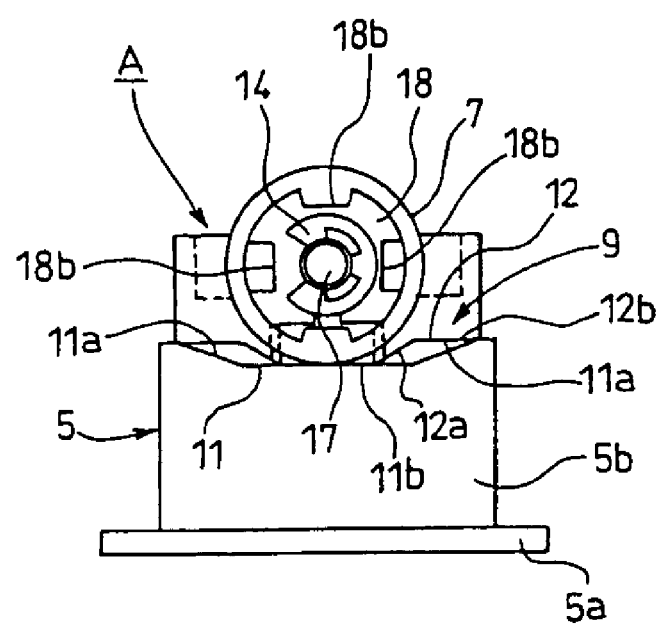
FIG. 8 is a right side view of the hinge for portable terminal according to the present invention.
Figure 9:
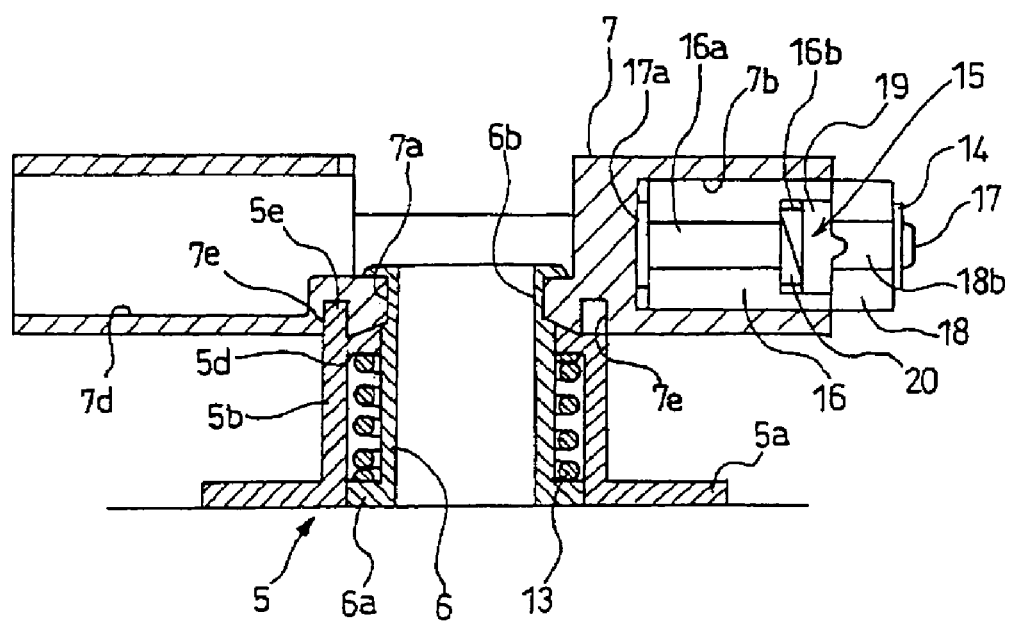
FIG. 9 is a partial vertical cross-sectional view showing an internal mechanism of the hinge for portable terminal according to the present invention.
Figure 10:
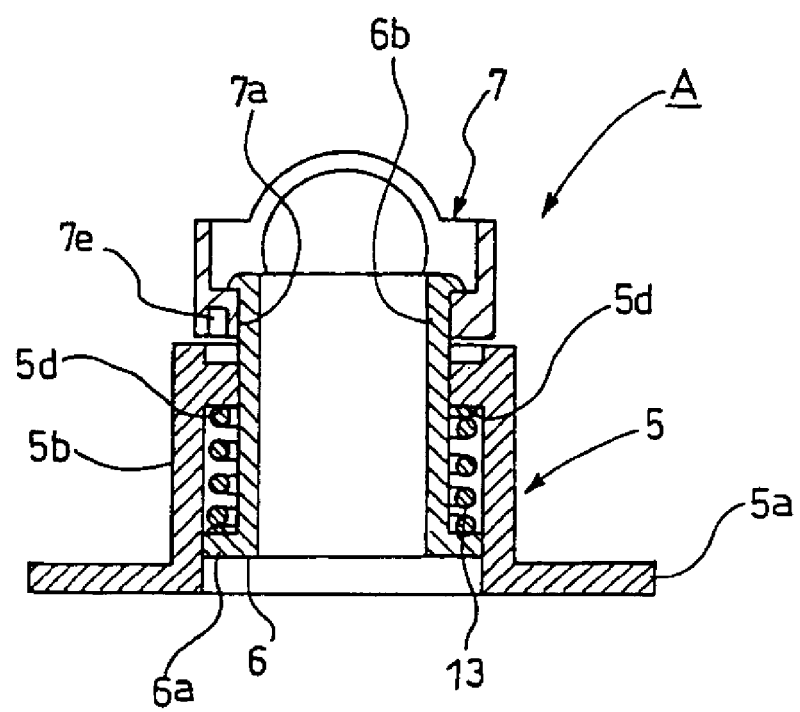
FIG. 10 is a vertical cross-sectional view showing the state when a rotary hinge part of the hinge for portable terminal according to the present invention is turned 90°.

FIG. 1 to FIG. 3 show a cellular phone B of a foldable type which is a kind of a portable terminal using a hinge A for portable terminal according to the present invention. In the drawings, the reference numeral 1 denotes a first casing having a keyboard portion 1a and a microphone 1b thereon, and the reference numeral 2 denotes a second casing having a display portion 2a, a speaker 2b, and a camera 2c thereon. The first casing 1 and the second casing 2 are coupled to each other at respective ends thereof via the hinge A for portable terminal to be turnable in a horizontal direction and openable/closable in a vertical direction relative to each other.

This hinge A for portable terminal is composed of a rotary hinge part 3 and an opening/closing hinge part 4. The rotary hinge part 3 is attached to an upper face of the end portion of the first casing 1 to turn the second casing 2 in the horizontal direction relative to the first casing 1. The opening/closing hinge part 4 is attached to the rotary hinge part 3 to open/close the second casing 2 in the vertical direction relative to the first casing 1. Mounting portions 2d, 2e of the second casing 2 are attached to the opening/closing hinge part 4.

As shown especially in FIG. 1 to FIG. 10, the rotary hinge part 3, out of these components, is composed of a fixed member 5 and a cylindrical rotary member 7. The fixed member 5 has a pivotally supporting cylinder 5b including a mounting base 5a which is attached to the upper face of the end portion of the first casing 1 with fixing screws 5c, 5c, . . . . The rotary member 7 is turnably attached at its substantially center portion to the pivotally supporting cylinder 5b of the fixed member 5 via a hinge shaft 6. The hinge shaft 6 has a flange portion 6a at a lower end portion thereof inserted in the pivotally supporting cylinder 5b, and also has a deformed portion 6b at an upper end portion thereof. The deformed portion 6b is inserted in a deformed mounting hole 7a formed in a substantially center portion of the rotary member 7, and the end portion is calked, so that the hinge shaft 6 is fixed to the rotary member 7.

Figure 14:
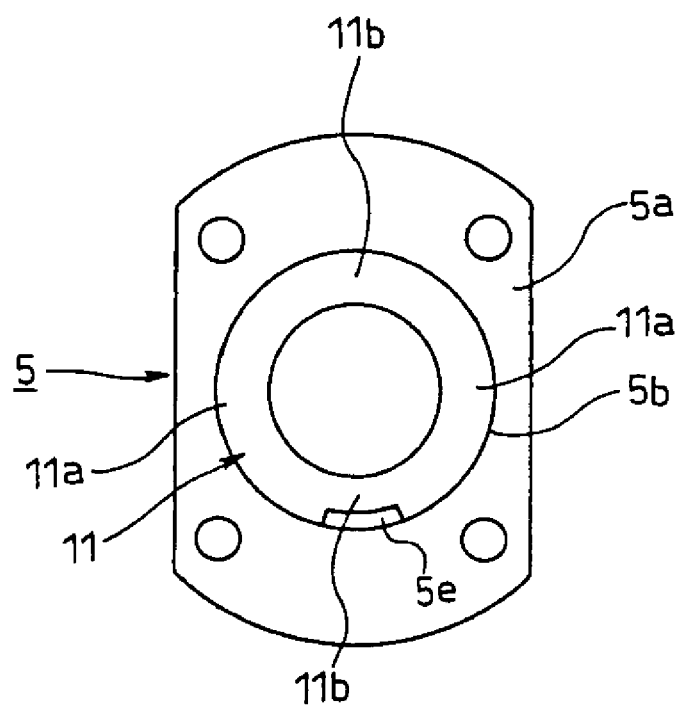
FIG. 14 is a plane view of a fixed member of the rotary hinge part of the hinge for portable terminal according to the present invention.
Figure 15:
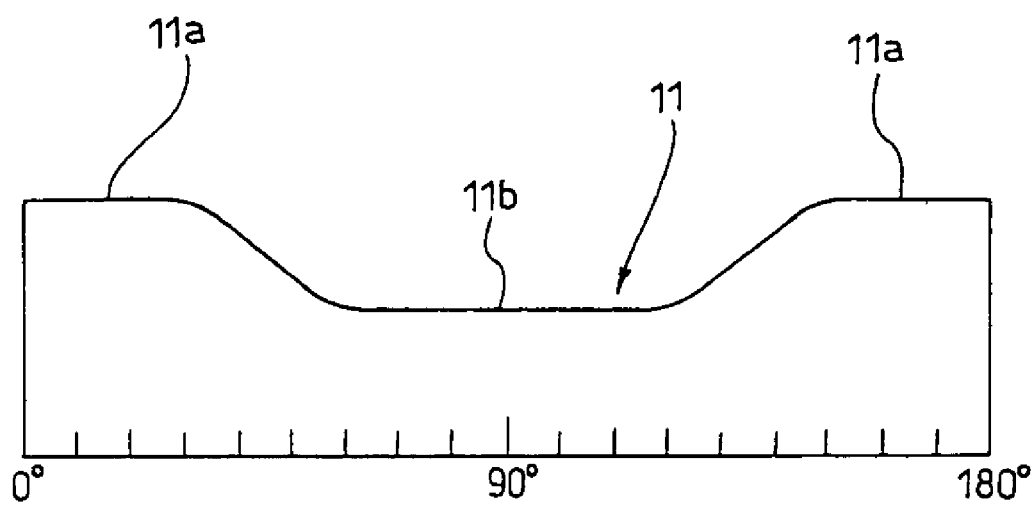
FIG. 15 is a developed view of a first cam portion of the fixed member of the rotary hinge part of the hinge for portable terminal according to the present invention.
Figure 16:
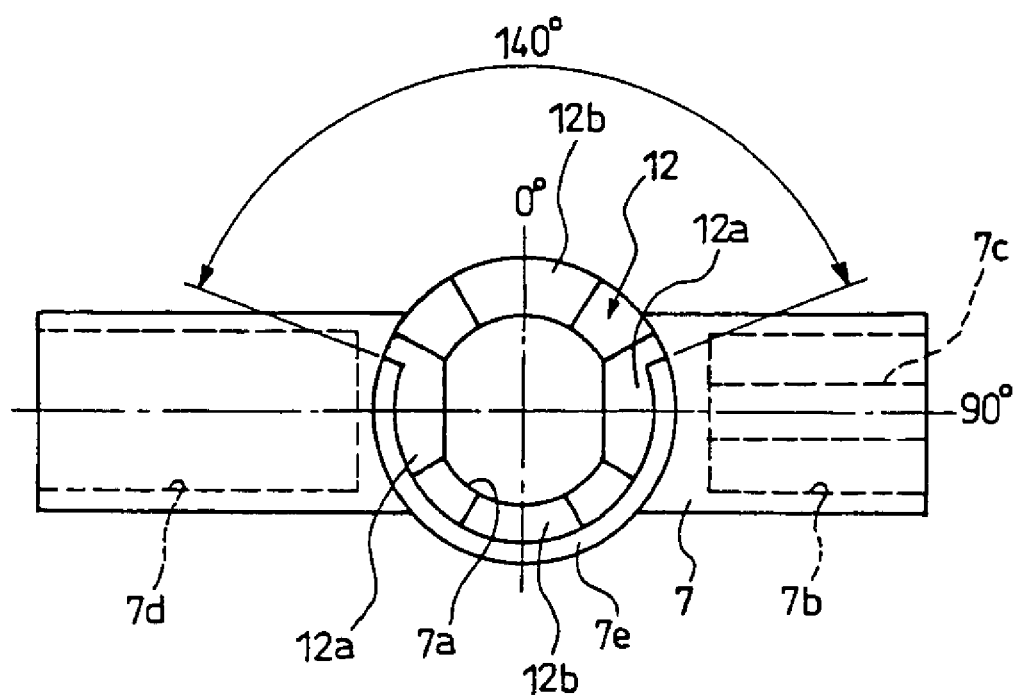
FIG. 16 is a bottom view of the rotary member of the rotary hinge part of the hinge for portable terminal according to the present invention.
Figure 17:
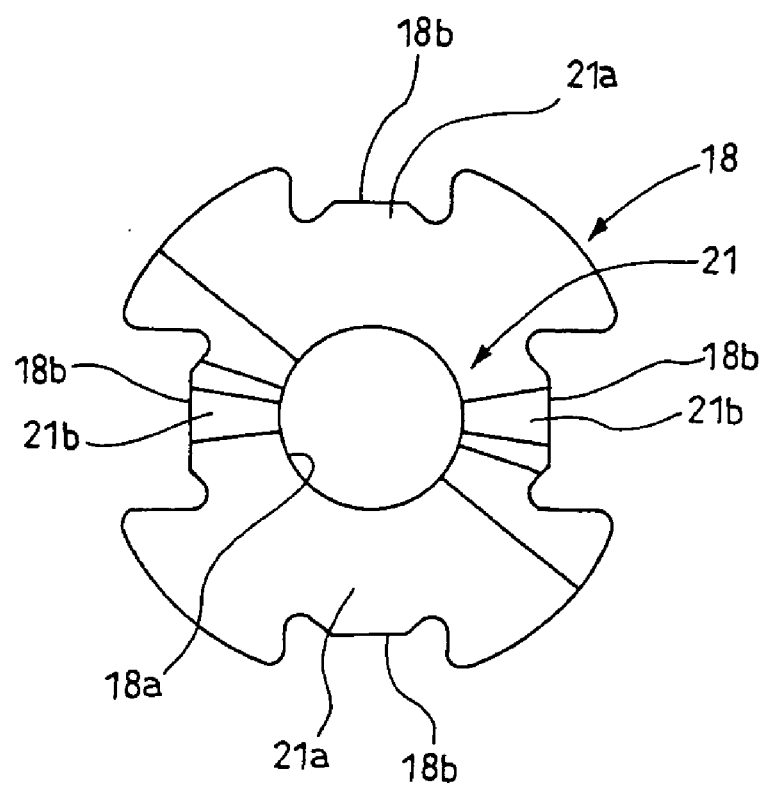
FIG. 17 is a left side view of a cam portion of the opening/closing hinge part of the hinge for portable terminal according to the present invention.
Figure 18:
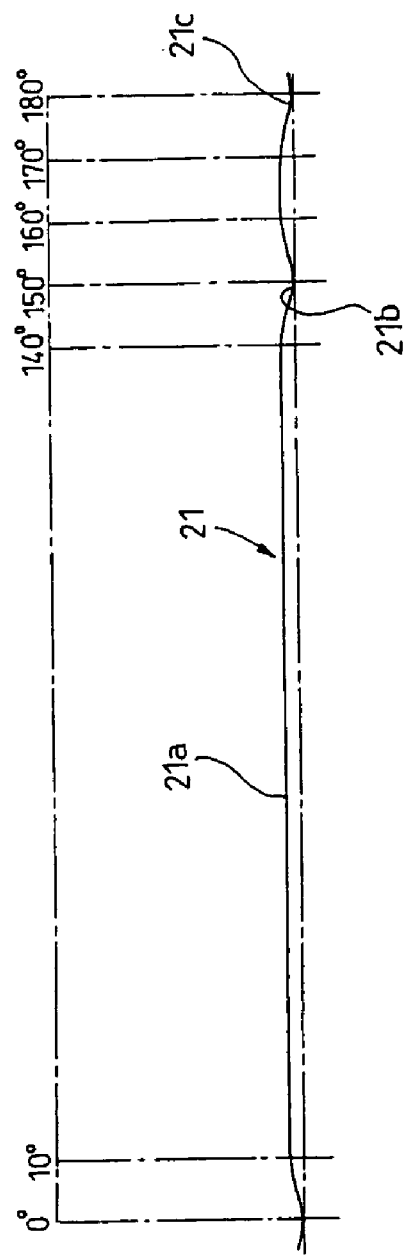
FIG. 18 is a developed view of the cam portion shown in FIG. 17.

The reference numeral 9 denotes a first cam mechanism of the rotary hinge part 3 side, and as shown especially in FIG. 14 to FIG. 16, this first cam mechanism 9 is composed of: a first cam portion 11 provided on an upper periphery of the pivotally supporting cylinder 5b of the fixed member 5 and constituted of protruding portions 11a, 11a and recessed portions 11b, 11b; a second cam portion 12 provided on a side of the rotary member 7 facing the first cam portion 11 and similarly constituted of protruding portions 12a, 12a and recessed portions 12b, 12b; and a first resilient means 13 for pressing the second cam portion 12 to the first cam portion 11, the first resilient means 13 being constituted of a compression spring which is coiled around the hinge shaft 6 to be resiliently interposed between the flange portion 6a of the hinge shaft 6 and an inner wall 5d on an upper end side of the pivotally supporting cylinder 5b.

Figure 13:
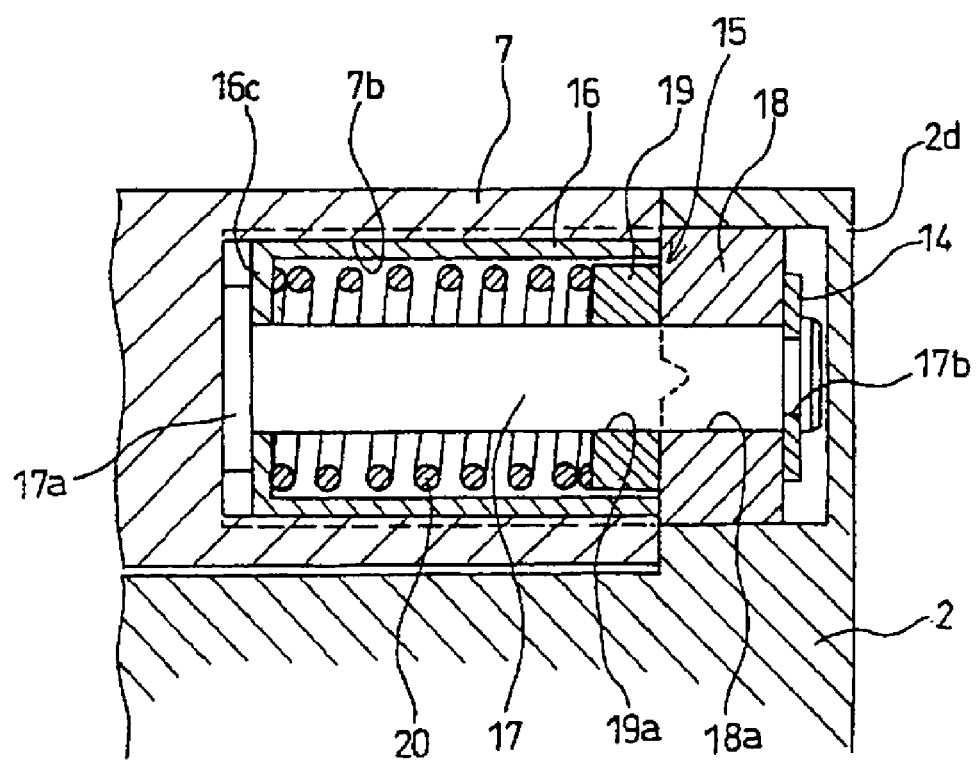
FIG. 13 is a vertical cross-sectional view showing the mounting state of the opening/closing hinge part of the hinge for portable terminal according to the present invention.

Next, as shown in FIG. 8 to FIG. 13, the opening/closing hinge part 4 is set in the cylindrical rotary member 7, and it includes: an opening/closing member 16 which has turn stoppers 16a, 16a extending on an outer periphery thereof in an axial direction and which is constituted of a hinge cylinder fittingly inserted in an insertion cylinder portion 7b having a turn stopper 7c in a protruding ridge shape provided on one of inner sides of the rotary member 7; a hinge pin 17 that has a deformed head portion 17a fitted in a side wall 16c of the opening/closing member 16 and passes through a center portion of the opening/closing member 16 in an axial direction to have a free end side thereof protrude from an open end side as especially shown in FIG. 13; a second cam 18 provided at the free end side of the hinge pin 17 and having at a center portion thereof an insertion hole 18a through which the hinge pin 17 is rotatably inserted; a cam floor 19 that similarly has at a center portion thereof an insertion hole 19a which is formed in an axial direction and through which the hinge pin 17 is inserted and that is inserted in the opening/closing member 16 to be slidable in the axial direction with a rotation thereof restricted by the opening/closing member 16; and a second resilient means 20 constituted of a compression spring coiled around the hinge pin 17 to be resiliently interposed between the side wall 16c of the opening/closing member 16 and the cam floor 19.

Figure 11:
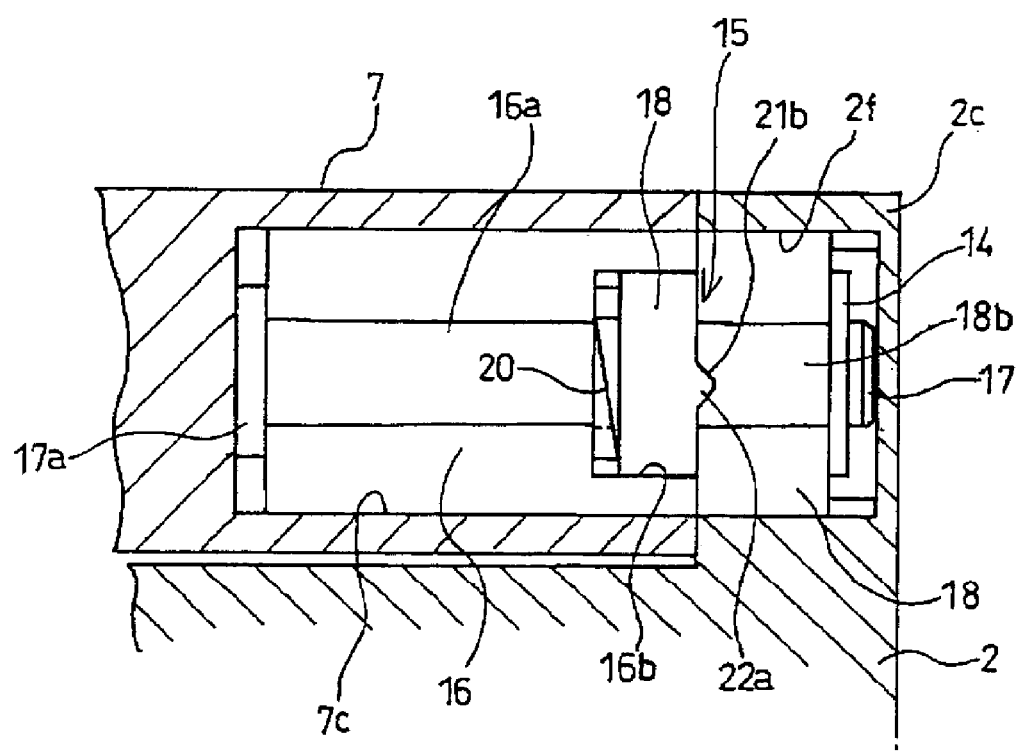
FIG. 11 is a partial front cross-sectional view showing the mounting state of an opening/closing hinge part of the hinge for portable terminal according to the present invention.
Figure 12:
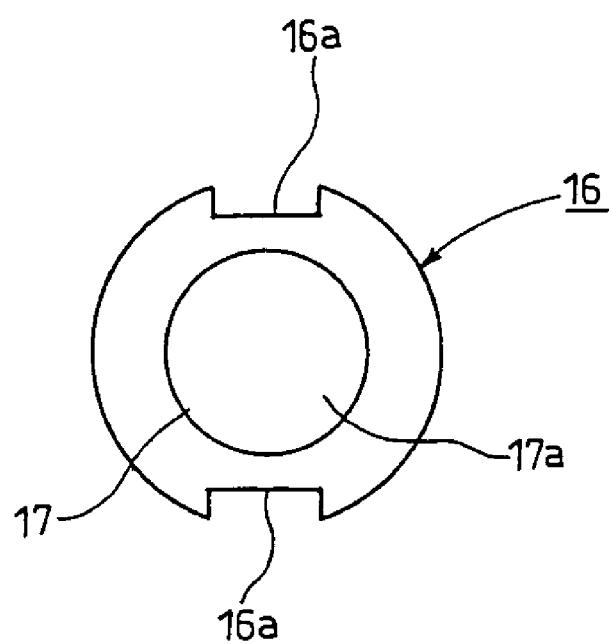
FIG. 12 is a left side view of the opening/closing hinge part of the hinge for portable terminal according to the present invention.
Figure 19:
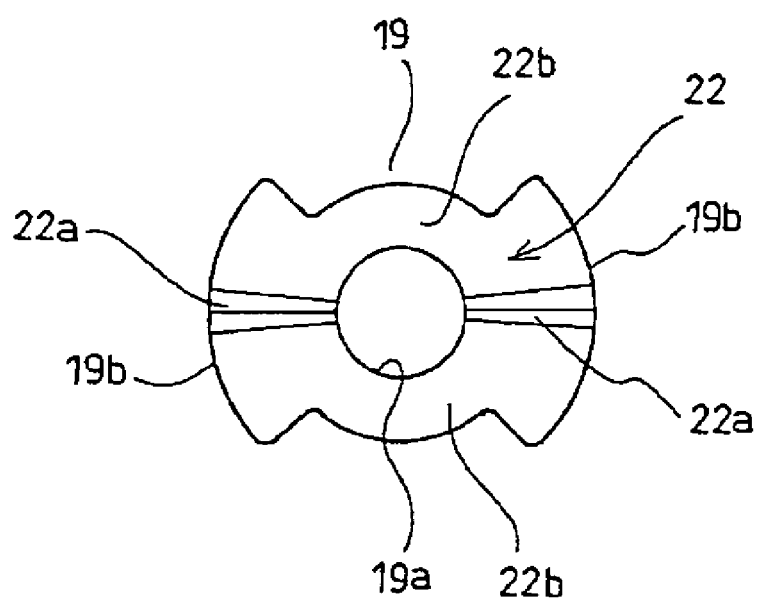
FIG. 19 is a right side view of a cam floor of the opening/closing hinge part of the hinge for portable terminal according to the present invention.
Figure 20:
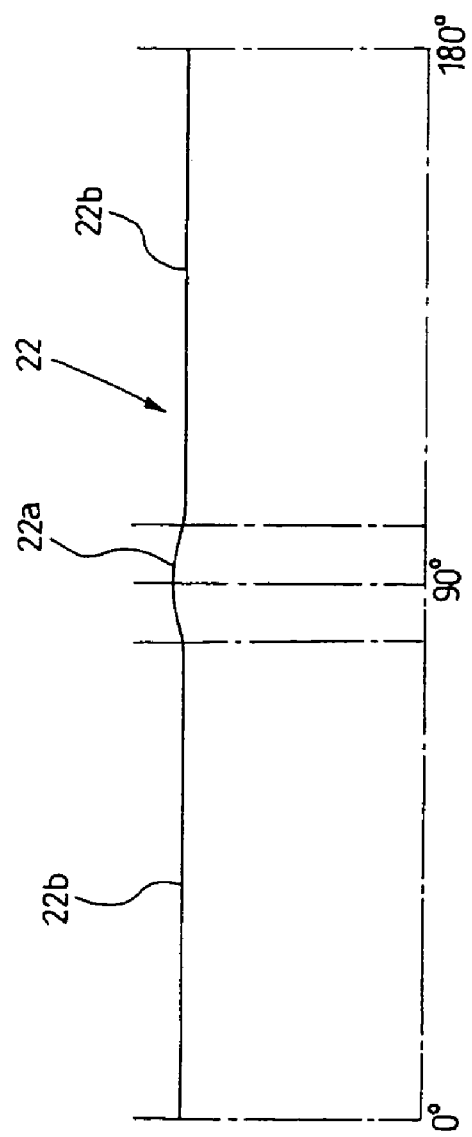
FIG. 20 is a developed view of the cam portion of the cam floor shown in FIG. 17.

Incidentally, a means for having the cam floor 19 caught by the opening/closing member 16 is composed of a pair of key portions 19b, 19b protruding from an outer periphery of the cam floor 19 as shown especially in FIG. 19 and key grooves 16b, 16b provided in the opening/closing member 16 as shown especially in FIG. 11 and FIG. 13 so as to have the key portions 19b, 19b fitted therein. On mutually facing surfaces of the second cam 18 and the cam floor 19, provided is a second cam mechanism 15 composed of cam portions 21, 22 formed of protruding portions 21a, 21a/22a, 22a and recessed portions 21b, 21b/22b, 22b as shown in FIG. 9, FIG. 11, and FIG. 17 to FIG. 20, and the cam portions 21, 22 are brought into pressure contact with each other by the second resilient means 20 as shown in FIG. 13.

As shown in FIG. 4 to FIG. 13, the reference numeral 14 denotes an E ring, and this E ring 14, when fitted in a peripheral groove 17b provided along an end portion of the hinge pin 17, locks the hinge pin 17 so as to prevent the hinge pin 17 from coming off the opening/closing member 16 as shown especially in FIG. 13.

Here, the mounting base 5a of the fixed member 5 of the rotary hinge part 3 of the hinge A for portable terminal according to the present invention is fixed to the upper face of the upper end of the first casing 1, using the fixing screws 5c, 5c . . . as shown in FIG. 1 and FIG. 3. The second cam 18 protruding from the opening/closing member 16 of the opening/closing hinge part 4 is coupled to a coupling hole 2f (see FIG. 11) of the mounting portion 2d out of the mounting portions 2d, 2e provided on an upper end portion of the second casing 2, utilizing turn stoppers 18b of the second cam 18, and the opening/closing hinge part 4 is coupled to the other mounting portion 2e via a third hinge pin 25 inserted in the mounting cylinder portion 7d.

With this structure, if an attempt is made to turn the second casing 2 in the horizontal direction relative to the first casing 1 while the first casing 1 and the second casing 2 are in a closed state as shown in FIG. 1 and FIG. 2, the second casing 2 is turnable in a right and a left direction up to 90° each, totally 180°, at whatever opening/closing angle it is positioned by the opening/closing hinge part 4. This turn angle is controlled by a stopper piece 5e provided on an upper end of the pivotally supporting cylinder 5b and a curved guide groove 7e which is provided on a bottom face of the rotary member 7 and in which the stopper piece 5e is fittingly inserted, as shown in FIG. 4 to FIG. 14 and FIG. 16. At this time, the protruding portions 11a, 11a of the cam portion 11 provided on a rotary member 7 side run on the protruding portions 12a, 12a of the cam portion 12 provided on the fixed member 5 side, so that the second casing 2 is slightly lifted up as shown especially in FIG. 10. Therefore, the upper face of the first casing 1 and the lower face of the second casing 2 are not rubbed by each other, and thus are not scratched.

Figure 21:
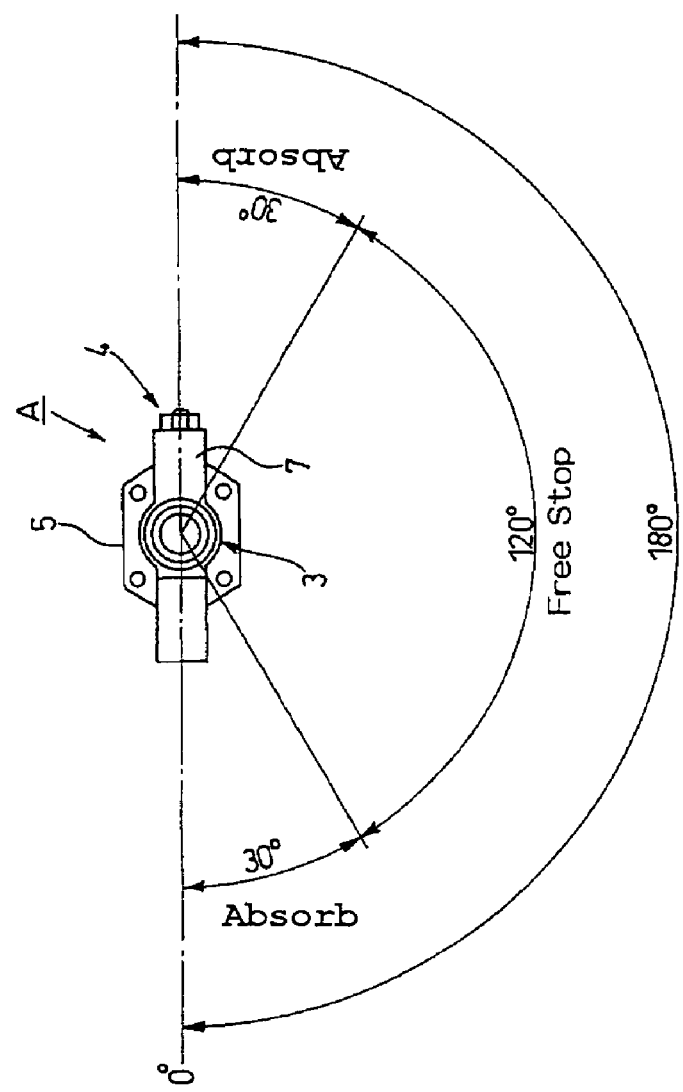
FIG. 21 is an explanatory view to explain the operation of the rotary hinge part of the hinge for portable terminal according to the present invention.

Further, in this embodiment, the second casing 2 is automatically opened by an absorbing function from an instant when the turn angle thereof in the right or left direction reaches 30° prior to 90°, due to facing positions of the protruding portions 11a, 11a and the recessed portions 11b, 11b of the first cam portion 11 provided on the upper end of the pivotally supporting cylinder 5b relative to the protruding portions 12a, 12a and the recessed portions 12b, 12b of the second cam portion 12 provided on the lower side of the rotary member 7. Specifically, automatic closing is performed when the protruding portions 12a, 12a of the second cam portion 12 of the rotary member 7 side drop in the recessed portions 11b, 11b of the first cam portion 11 of the pivotally supporting cylinder 5b side due to the turn angle thereof, and in the other state, namely, while the protruding portions 12a, 12a of the second cam portion 12 and the protruding portions 11a, 11a of the first cam portion 11 are facing each other to be in pressure contact with each other, a free-stop function works. A lock state is produced when the protruding portions 12a, 12a of the second cam portion 12 drop in the recessed portions 11b, 11b of the first cam portion 11. FIG. 21 is an explanatory view to explain the operation described above. Note that the sides and the positions where the protruding portions and the recessed portions of the respective cam portions 11, 12 are provided may be reverse to those in this embodiment.

Figure 22:
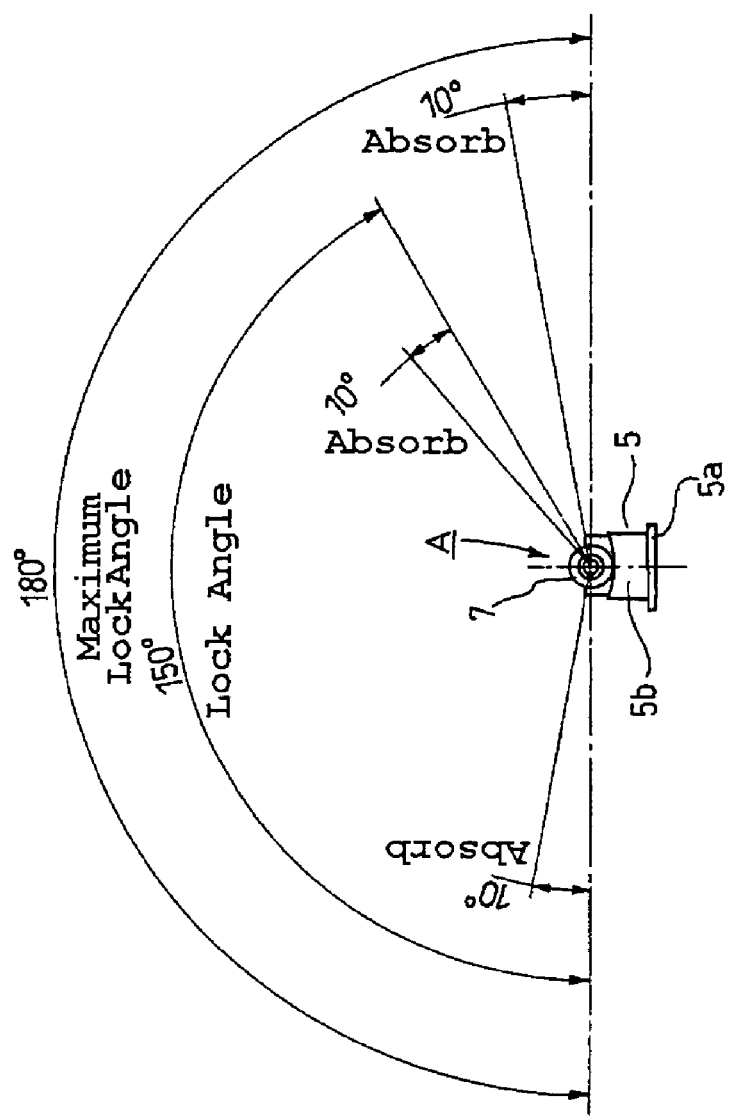
FIG. 22 is an explanatory view to explain the operation of the opening/closing hinge part of the hinge for portable terminal according to the present invention.

Next, the opening/closing operation by the opening/closing hinge part 4 is performed while being controlled by the respective cam portions 21, 22 of the second cam 18 and the cam floor 19. In this embodiment, owing to a resilient force of the second resilient means 20, an absorbing function works from an instant 10° prior to the maximum opening angle 180° and from an instant similarly 10° prior to the closing angle 0° to result in automatic opening/closing, and in addition, the absorbing function also works between 140° and 150°, depending on the relative facing positions of the protruding portions 21a, 21a/22a, 22a and the recessed portions 21b, 21b/22b, 22b constituting the respective cam portions 21, 22. Between the opening angles 10° and 170°, a free-stop function works. Specifically, the second casing 2 is automatically closed or opened when the protruding portions 21a, 21a of the cam portion 21 of the second cam 18 drop in the recessed portions 22b, 22b of the cam portion 22 of the cam floor 19. The free-stop function works when the protruding portions 21a, 21a of the cam portion 21 of the second cam 18 are in pressure contact with the protruding portions 22a, 22a of the cam portion 22 of the cam floor 19. This operation is explained in FIG. 22.

A lock state is produced when the protruding portions 21a, 21a of the cam portion 21 of the second cam 18 drop in the recessed portions 22b, 22b of the cam portion 22 of the cam floor 19. The sides and positions where the protruding portions and recessed portions of the respective cam portions 21, 22 are provided may be reverse to those of this embodiment.

The hinge according to the present invention is structured such that the rotary member 7 is turnable, in other words, the second casing 2 is turnable relative to the first casing 1 at whatever opening/closing angle between 0° and 180° they are. This allows the second casing 2 to be bent at an arbitrary angle relative to the first casing 1, which realizes not only good operability in picking up a laterally wide image of a subject by a camera but also good visibility in viewing a laterally wide image displayed on a screen of the display portion.

In the above embodiment, a cellular phone is described as an example of a portable terminal, but the hinge for portable terminal according to the present invention is also usable as it is as a hinge for a PHS, a personal digital assistance (PDA), and the like other than the cellular phone.

The opening/closing hinge part 4 may be structured such that the opening/closing member 16 itself is rotatable and is coupled to the mounting portion side of the second casing 2, and the cam floor 19 side is locked by the rotary member 7 side.

Further, the rotary hinge part 3 may of course have the similar structure as that of the opening/closing hinge part 4, and the opening/closing member 16 of the opening/closing hinge part 4 may be a second hinge pin, instead of the hinge cylinder, on which the second cam mechanism is made to act.

As has been detailed hitherto, with the rotary hinge part and the opening/closing hinge part that are integrated to have a compact structure, the first casing having the keyboard portion thereon and the second casing having the display portion thereon of the portable terminal are not only foldable via the opening/closing hinge part with the keyboard portion and the display portion facing each other when not in use but also openable/closable. In addition, when they are opened for use, the second casing having the display portion is turned relative to the first casing via the rotary hinge part in a perpendicular direction to the opening/closing direction when necessary. This allows the use of the display portion both in a vertically long state and in a laterally long state.

What is claimed is:

1. A hinge for portable terminal coupling a first casing on which a keyboard portion is provided and a second casing on which a display portion is provided to each other, comprising:
    a rotary hinge part to which the first casing is coupled to be turnable relative to the second casing in a horizontally direction; and
    an opening/closing hinge part to which the second casing is coupled to be openable/closable relative to the first casing in a vertical direction;
    wherein said rotary hinge part composed of a fixed member having a pivotally supporting cylinder and a mounting base which is attached to the upper face of the first casing, a hinge shaft inserted through the pivotally supporting cylinder in an axial direction, and a rotary member attached to the hinge shaft with a turn thereof being controlled via a first cam mechanism;
    wherein said opening/closing hinge part is provided in said rotary member and has an opening/closing member which is rotatably mounted with a rotation thereof being controlled, to be in a perpendicular direction to a direction of the turn of said rotary hinge part via a second cam mechanism and to which an end portion of the second casing is coupled;
    wherein said first cam mechanism includes a first cam portion provided at an upper end of said rotary supporting cylinder, a second cam portion provided at a position facing said first cam portion on a lower face of said rotary member, and a resilient means for bringing said second cam portion into pressure contact with said first cam portion, said resilient means being resiliently provided between a flange portion of the hinge shaft and the pivotally supporting cylinder.

2. The hinge for portable terminal according to claim 1, wherein at least one of said first cam mechanism and said second cam mechanism has an absorbing function, the absorbing function of said first cam mechanism being a function of automatically turning said rotary member from a predetermined turn angle, and the absorbing function of said second cam mechanism being a function of automatically opening/closing said opening/closing member from a predetermined opening/closing angle.

3. The hinge for portable terminal according to claim 1, wherein said rotary hinge part is allowed to operate from an instant when said opening/closing hinge part is opened to a predetermined angle.

4. The hinge for portable terminal according to claim 1, wherein said opening/closing member is a hinge cylinder.

5. The hinge for portable terminal according to claim 3, further comprising a means for allowing said rotary hinge part to operate from the instant when said opening/closing hinge part is opened to the predetermined angle, the means being provided between said opening/closing member of said opening/closing hinge part and said fixed member of said rotary hinge part.

6. The hinge for portable terminal according to claim 1, wherein each of said first cam mechanism and said second cam mechanism is constituted of a cam and a cam floor in which cam portions are formed on respective facing surfaces thereof, one of the cam portions being in pressure contact with the other cam portion.

7. The hinge for portable terminal according to claim 1, wherein said first cam and said second cam each having protruding portions and recessed portions so that when said each protruding portions abut against each other, said hinge shaft slightly lifted up with the rotary member against the resilient means.

* * * * *